(12) United States Patent
Seto

(10) Patent No.: US 6,919,565 B2
(45) Date of Patent: Jul. 19, 2005

(54) INFRARED IMAGING APPARATUS AND INFRARED MONITORING APPARATUS FOR VEHICLE

(75) Inventor: Toshiki Seto, Tokyo (JP)

(73) Assignee: Mitsubishi Denki Kabushiki Kaisha, Tokyo (JP)

( * ) Notice: Subject to any disclaimer, the term of this patent is extended or adjusted under 35 U.S.C. 154(b) by 167 days.

(21) Appl. No.: 10/202,100

(22) Filed: Jul. 25, 2002

(65) Prior Publication Data

US 2003/0173517 A1 Sep. 18, 2003

(30) Foreign Application Priority Data

Mar. 14, 2002 (JP) .................................... 2002-070304

(51) Int. Cl.$^7$ .............................................. G01N 21/59
(52) U.S. Cl. ...................................... 250/330; 250/332
(58) Field of Search ................................. 250/330, 332

(56) References Cited

U.S. PATENT DOCUMENTS

| | | | | | |
|---|---|---|---|---|---|
| 3,056,958 | A | * | 10/1962 | Anderson | 342/462 |
| 4,561,775 | A | * | 12/1985 | Patrick et al. | 356/5.04 |
| 4,694,172 | A | * | 9/1987 | Powell et al. | 250/339.15 |
| 4,843,565 | A | * | 6/1989 | Rose | 701/301 |
| 4,947,044 | A | * | 8/1990 | Pinson | 250/330 |
| 5,389,788 | A | * | 2/1995 | Grinberg et al. | 250/331 |
| 5,408,099 | A | * | 4/1995 | Barr et al. | 250/341.8 |
| 5,414,439 | A | * | 5/1995 | Groves et al. | 345/7 |
| 5,534,694 | A | * | 7/1996 | Ball et al. | 250/330 |
| 5,619,036 | A | * | 4/1997 | Salvio et al. | 250/330 |
| 6,222,618 | B1 | * | 4/2001 | Hasson | 356/4.07 |
| 6,420,704 | B1 | * | 7/2002 | Berenz et al. | 250/330 |
| 6,476,391 | B1 | * | 11/2002 | Zhang | 250/330 |
| 6,690,011 | B2 | * | 2/2004 | Watanabe et al. | 250/330 |
| 2001/0045516 | A1 | * | 11/2001 | Emanuel et al. | 250/332 |
| 2003/0047683 | A1 | * | 3/2003 | Kaushal | 250/330 |

FOREIGN PATENT DOCUMENTS

| JP | 2-78906 | 3/1990 |
|---|---|---|
| JP | 2001-16578 | 1/2001 |

* cited by examiner

*Primary Examiner*—Albert Gagliardi
(74) *Attorney, Agent, or Firm*—Burns, Doane, Swecker & Mathis, L.L.P.

(57) ABSTRACT

To obtain an image signal in which the distance to a target can be recognized, an infrared imaging apparatus 47 comprises an infrared irradiation unit 48 for radiating infrared radiation in an attenuation wavelength range in which the infrared radiation is attenuated according to the transmitted distance and an infrared imaging unit 49 for detecting infrared radiation emitted from the target and infrared radiation reflected by the target, and outputting an image signal. When the infrared irradiation unit 48 irradiates infrared in an attenuation wavelength range, that is, an absorption wavelength range wherein the transmittance in the air is small and the absorption in the air is high, the intensity of the reflected light from the target varies according to the distance to the target. The infrared imaging unit 49 detects the reflected light from the target which is attenuated depending on the distance in addition to and superposed to the infrared radiation emitted from the target. In this manner, an image signal in which the infrared components are superposed, that is, an image signal in which the distance to the target can be recognized, can be output.

5 Claims, 8 Drawing Sheets

INFRARED IMAGING APPARATUS AND INFRARED MONITORING APPARATUS FOR VEHICLE

BACKGROUND OF THE INVENTION

1. Field of the Invention

The present invention relates to an infrared imaging apparatus, and to an infrared monitoring apparatus for a vehicle for monitoring areas in front of or behind the vehicle using the infrared imaging apparatus.

2. Description of the Related Art

Conventionally, infrared imaging apparatuses for detecting infrared radiation emitted from a target and for outputting image signals are known. These infrared imaging apparatuses are put into practice as infrared monitoring apparatuses for vehicles for monitoring the area around the vehicles.

FIG. 6 is a block diagram showing a structure of such a conventional infrared imaging apparatus. FIG. 7 is a diagram showing an overall configuration of an infrared monitoring apparatus for a vehicle which uses the infrared imaging apparatus shown in FIG. 6.

As shown in FIG. 6, an infrared imaging apparatus 40 comprises a lens 1 for focusing received infrared radiation such as that emitted from a target, and an infrared detector 2 for detecting the infrared focused by the lens 1 and converting the detected infrared radiation into an electrical signal. The electrical signal converted by the infrared detector 2 is amplified by an amplifier circuit 3, converted into a digital signal by an A/D converter 4, and then, converted to an image signal 6 by an image processor circuit 5.

As shown in FIG. 7, an infrared monitoring apparatus 41 for a vehicle comprises the infrared imaging apparatus 40 which is provided at the front of a vehicle 42 and a video monitor 43 for displaying an image based on the image signal 6 output from the infrared imaging apparatus 40. In the infrared monitoring apparatus 41 for a vehicle having such structure, the image signal 6 output from the image processor circuit 5 of the infrared imaging apparatus 40 is input to the video monitor 43 which displays an image. This image is, for example, displayed as a black and white image shaded according to the intensity of the detected infrared. A driver 44 within the vehicle 42 can monitor targets in front of the vehicle 42 by viewing the image displayed on the video monitor 43.

The infrared monitoring apparatus 41 can display targets that are far away and that are difficult, particularly at night, to be seen by the naked eye and thus, the monitored area can be broadened compared to that relying only on the naked eye.

Further, there is a demand for recognizing the distance to a target in the infrared monitoring apparatus 41 for a vehicle because recognition of the distance to a target allows the driver to decide whether or not action should be taken to avoid the target.

However, in the conventional infrared imaging apparatus 40, there is a problem in that it is difficult to recognize the distance to targets. For example, when two people 45 and 46 are present as targets in front of the vehicle 42 as shown in FIG. 7, an image, for example, as shown in FIG. 8 is shown on the video monitor 43. In this case, the driver 44 cannot decide which of the two people 45 and 46 is closer to the vehicle.

This is because it is not possible for the infrared imaging apparatus 40 used in the monitoring apparatus to output an image signal including useful distance information based on the infrared radiation emitted from the target to be detected. More particularly, the infrared radiation emitted from the target is predominantly dependent on the temperature of the target and, thus, the variation in the reception intensity attributable to the distance to the targets is small.

Also, in a typical infrared imaging apparatus 40, the sensitivity of the infrared detector 2 is tuned so that targets at a greater distance can also be detected. However, when this is done, the detected intensity of infrared radiation emitted from targets does not vary significantly even if there is a difference in the distance to the target from the infrared detector 2. Therefore, the infrared detector 2 cannot output an image signal including distance information based on the received signal of infrared radiation emitted from the target.

Furthermore, in order to detect targets at a greater distance, the infrared imaging apparatus 40 in some cases is designed so that the infrared detector 2 detects infrared light in a wavelength range of, for example, 3 $\mu$m~5 $\mu$m or 8 $\mu$m~13 $\mu$m in which transmittance in air is high, from among various infrared radiation emitted from a target. In such cases, because the attenuation of the infrared emitted from the target and transmitted through the air is small, the difference in the detection intensity of the infrared radiation from targets at different distances is small and, thus, the infrared detector 2 cannot output an image signal including information on the distance to the target based on the received signal.

The present invention was conceived to solve at least the above described problems, and one object of the present invention is to provide an infrared imaging apparatus for outputting an image signal in which the distance to the target can be recognized, that is, an image signal including distance information.

SUMMARY OF THE INVENTION

In order to achieve at least the object described above, according to one aspect of the present invention, there is provided an infrared imaging apparatus for detecting infrared radiation emitted from a target and outputting an image signal, the infrared imaging apparatus comprising an infrared irradiation unit for radiating infrared radiation in an attenuation wavelength range in which the infrared radiation is attenuated depending on the transmitted distance, and an infrared imaging unit for detecting infrared radiation emitted from the target and infrared radiation reflected by the target and outputting an image signal.

According to another aspect of the present invention, it is preferable that, in the infrared imaging apparatus, the infrared imaging unit comprises an infrared detector for detecting infrared radiation emitted from a target and infrared reflected by a target, and converting the detected infrared radiation into an electrical signal; a circuit for obtaining, from the electrical signal, an emitted light signal which is based on the infrared radiation emitted from the target; a circuit for obtaining, from the electrical signal, a reflected light signal which is based on the infrared radiation reflected by the target onto which infrared radiation is irradiated from the infrared irradiation unit; a weight adjustor for assigning a predetermined weight to the brightness of the reflected light signal; and a signal synthesizer for adding the emitted light signal and the weighted reflected light signal to produce a synthesized signal.

According to yet another aspect of the present invention, it is preferable that, in the infrared imaging apparatus, the infrared imaging unit further comprises a high-pass filter for passing the high frequency component of the emitted light signal; and that the weight adjuster assigns the predetermined weight to the brightness of the reflected light signal based on the detection value of the high frequency component of the emitted light signal at the high-pass filter.

According to yet another aspect of the present invention, it is preferable that, in the infrared imaging apparatus, the infrared imaging unit is an uncooled IR camera.

According to a further aspect of the present invention, it is preferable that, in the infrared imaging apparatus, the infrared radiation in the attenuation wavelength range radiated by the infrared irradiation unit is infrared radiation in a wavelength range of 5 micrometers to 8 micrometers.

According to another aspect of the present invention, there is provided an infrared monitoring apparatus for a vehicle, comprising an infrared imaging apparatus for detecting infrared radiation emitted from a target and outputting an image signal, the infrared imaging apparatus comprising an infrared irradiation unit for irradiating infrared radiation in an attenuation wavelength range in which the infrared radiation is attenuated depending on the transmitted distance, and an infrared imaging unit for detecting infrared radiation emitted from the target and infrared radiation reflected by the target and outputting an image signal; and a display device for displaying an image based on the image signal output from the infrared imaging apparatus.

BRIEF DESCRIPTION OF THE DRAWING(s)

DESCRIPTION OF PREFERRED EMBODIMENTS

Figure 1:
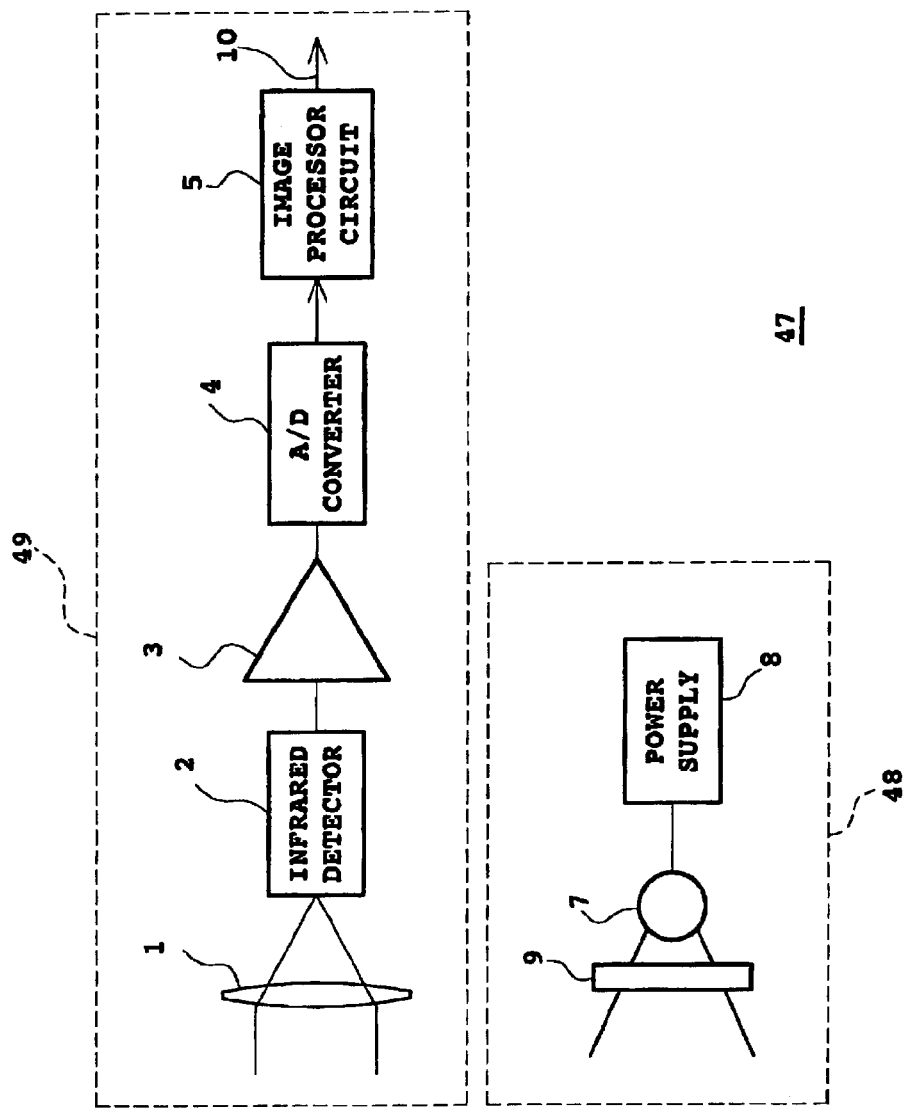
FIG. 1 is a diagram showing a structure of an infrared imaging apparatus according to a first embodiment of the present invention.

Preferred embodiments of the present invention will now be described with reference to drawings. In the drawings, elements in the embodiments identical to or corresponding to elements in the related art are assigned the same reference numerals.

Embodiment 1

FIG. 1 shows a structure of an infrared imaging apparatus according to a first embodiment of the present invention. As will be described later, the infrared imaging apparatus of the first embodiment can be used as, for example, an infrared monitoring apparatus for a vehicle.

As shown in FIG. 1, an infrared imaging apparatus 47 comprises an infrared irradiation unit 48 for radiating infrared radiation in an attenuating wavelength range in which the infrared radiation is attenuated depending on the transmitted distance and an infrared imaging unit 49 for detecting infrared radiation emitted from a target and infrared radiation reflected from the target and outputting an image signal.

A characteristic of the first embodiment is that an infrared irradiation unit 48 is provided which irradiates infrared radiation in a wavelength range in which the absorption of the infrared radiation in air is high (hereinafter referred to as "absorption wavelength range") as an infrared radiation in an attenuation wavelength range in which the infrared radiation is attenuated depending on the transmitted distance.

Figure 2:
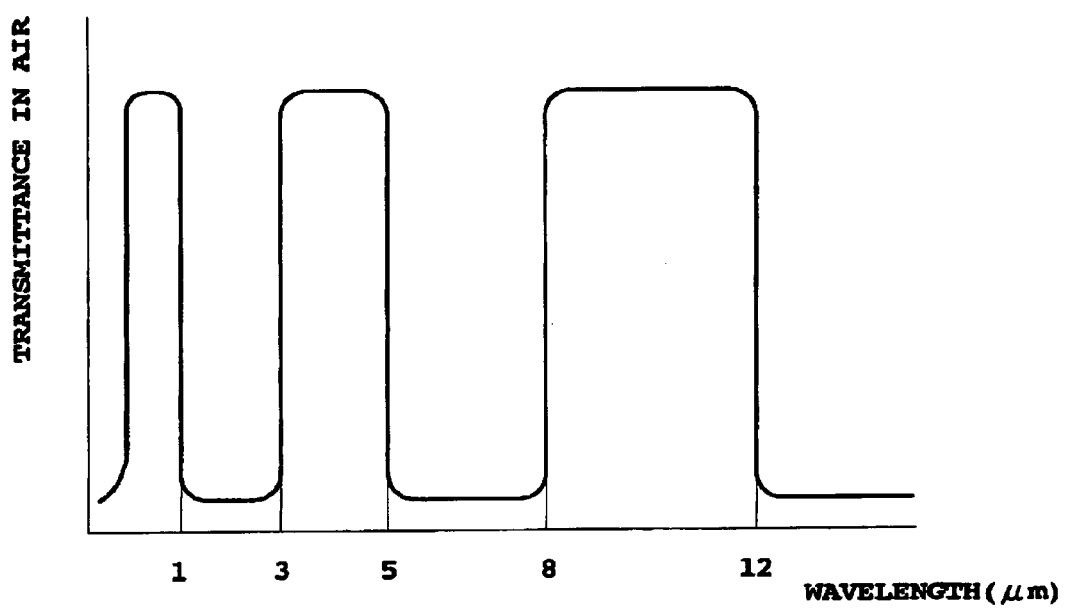
FIG. 2 is a diagram showing the transmission characteristic of infrared radiation through air.

FIG. 2 shows transmission characteristic through air of infrared radiation of various wavelengths. As shown in FIG. 2, infrared radiation in the 5 $\mu$m~8 $\mu$m range exhibits small transmittance through air and infrared radiation in the 3 $\mu$m~5 $\mu$m range and in the 8 $\mu$m~12 $\mu$m range at both side of the 5 $\mu$m~8 $\mu$m range in FIG. 2 exhibit a high transmittance through air. The infrared radiation in the 5 $\mu$m~8 $\mu$m range is absorbed by the air while transmitting through the air and is significantly attenuated. That is, when the infrared irradiation unit 48 radiates an infrared radiation having a small transmittance through air, that is, an infrared radiation in the absorption wavelength range in which the absorption in air is high, the intensity of the reflection from the target varies depending on the distance to the target. In other words, when infrared radiation in an absorption wavelength range is radiated by the infrared irradiation unit 48, the reflected light from a relatively close target is captured by the infrared imaging unit 49 with small attenuation and the reflected light from a target at farther away is captured by the infrared imaging unit 49 with higher attenuation than the light reflected from the target at a small distance. As a result, the infrared imaging unit 49 can detect reflected light from the target which is attenuated depending on the distance, along with and superposed to the infrared radiation emitted from the target. The infrared imaging unit 49 can then output an image signal based on the superposed infrared signals. As a result, the infrared imaging apparatus can output an image signal from which distance to a target can be recognized.

In the specification, "reflected light" refers to the infrared radiation output by the infrared irradiation unit and then reflected by the target.

Each component of the infrared imaging apparatus 47 will now be described.

The infrared irradiation unit 48 comprises an infrared source 7 for emitting infrared radiation, a power supply 8 for the infrared source 7, and an optical filter 9 placed in front of the infrared source 7.

In the first embodiment, the infrared source 7 comprises an infrared lamp and emits infrared radiation by generating heat with a filament. The infrared lamp 7 emits infrared radiation over a wide range of wavelengths. The infrared radiation emitted from the infrared lamp 7 is filtered by the optical filter 9 so that only light in the absorption wavelength range is passed through. The infrared source is not limited to an infrared lamp, and can comprise, for example, an infrared light emitting diode, an infrared laser, or the like.

The power supply 8 is for supplying power to the infrared lamp 7, and supplies, for example, a predetermined direct current power from the power supply circuit of the vehicle to the infrared lamp 7.

In the first embodiment, the optical filter 9 allows the infrared radiation in a wavelength range of, for example, 5 $\mu$m~8 $\mu$m to pass through as the infrared radiation in the absorption wavelength range. The infrared radiation in the 5

μm~8 μm range is absorbed by the air as the infrared radiation travels through the air and is significantly attenuated depending on the distance. In this manner, the infrared imaging unit 49 can detect, light reflected by a target and attenuated depending on the distance to the object.

The structure of the infrared imaging unit 49 will now be described. The infrared imaging unit 49 is for detecting the infrared radiation from a target and outputting an image signal, and has a basic structure similar to the infrared imaging apparatus 40 described for the related art.

The infrared imaging unit 49 comprises a lens 1 for focusing infrared radiation and an infrared detector 2 for detecting the infrared radiation focused by the lens 1 and converting the detected infrared radiation into an electrical signal. The infrared imaging unit 49 further comprises an amplifier circuit 3 for amplifying the electrical signal converted by the infrared detector 2, an A/D converter 4 for converting the electrical signal amplified by the amplifier circuit 3 into a digital signal, and an image processor circuit 5 for converting the digital signal converted by the A/D converter 4 into an image signal 10.

It is preferable that, in the first embodiment, an uncooled infrared camera, which is one type of thermal unit, be used in the infrared imaging unit. Because a change in temperature of an infrared detector (detector element) caused by the received infrared radiation is detected in an uncooled infrared camera, the range of detectable wavelengths is relatively broad. Therefore, the reflected light of infrared radiation in the 5 μm~8 μm range radiated from the infrared irradiation unit can be detected. Also, because the uncooled infrared camera does not require a freezer for cooling the infrared detector, the size, weight, and cost of the infrared imaging unit can be reduced and the lifetime of the infrared imaging unit can be improved.

Each component will now be described.

The lens 1 is placed in front of the infrared detector 2. In this manner, the lens 1 can focus, onto the infrared detector 2, the infrared radiation emitted from the target and the infrared radiation reflected by the target.

The infrared detector 2 detects the infrared radiation focused by the lens 1 and converts the detected radiation into an electrical signal. In the example of the first embodiment, the infrared detector 2 detects the infrared radiation in the wavelength range of 8 μm~12 μm as the infrared radiation emitted from the target and the infrared radiation in the wavelength range of 5 μm~8 μm irradiated from the infrared irradiation unit 48 and reflected by the target. The infrared detector 2 then outputs an electrical signal in which the infrared radiation emitted from the target and the reflected light from the target are superposed.

The electrical signal converted by the infrared detector 2 is amplified by the amplifier circuit 3 and converted into a digital signal by the A/D converter 4.

The image processor circuit 5 converts the digital signal converted by the A/D converter 4 into an image signal 10 and outputs the image signal 10. It is also preferable that signal processing such as, for example, noise reduction, image defect correction, automatic gain control, and gamma correction, be performed by the image processor circuit 5.

The image signal 10 converted by the image processor circuit 5 is output to a display device (not shown) and an image is displayed. This image is displayed to indicate the distance to the target by variably modulating the brightness of the displayed image according to the distance to the target. For example, if the image is displayed as a shaded black and white image, targets which are closer can be displayed in a whiter color and targets farther away can be displayed in a blacker color. The distance to a target can be easily recognized simply by viewing the displayed image.

The operation of the infrared imaging apparatus of the first embodiment will now be described.

The infrared lamp 7 of the infrared irradiation unit 48 emits infrared radiation and the optical filter 9 filters the radiation and outputs the infrared radiation component in the absorption wavelength range. Because the absorption by the air of the infrared radiation irradiated by the infrared irradiation unit 48 is high, the infrared radiation is absorbed as it travels through the air and is attenuated according to the distance traveled. Therefore, the infrared imaging unit 49 receives both light emitted from the target and the reflected light having an intensity which varies according to the distance of the target.

The lens 1 of the infrared imaging unit 49 focuses the infrared radiation from the target. The focused infrared radiation is detected by the infrared detector 2 and converted into an electrical signal. The infrared detector 2 detects the emitted infrared radiation and the light reflected from the target, and converts the detected light into an electrical signal in which the emitted light and reflected light are superposed. The electrical signal converted by the infrared detector 2 is processed by the amplifier circuit 3 and the A/D converter 4, and then is converted to an image signal 10 by the image processor circuit 5. The image signal 10 converted by the image processor circuit 5 is output to a display device (not shown) and an image is displayed.

As described, according to the first embodiment, the infrared irradiation unit irradiates infrared radiation in an absorption wavelength range so that the infrared imaging unit can detect infrared light reflected by an irradiated target of an intensity dependent on the distance, along with and superposed to the infrared radiation emitted by the target itself. In this manner, an image signal from which the distance to the target can be recognized can be output.

Second Embodiment

Figure 3:
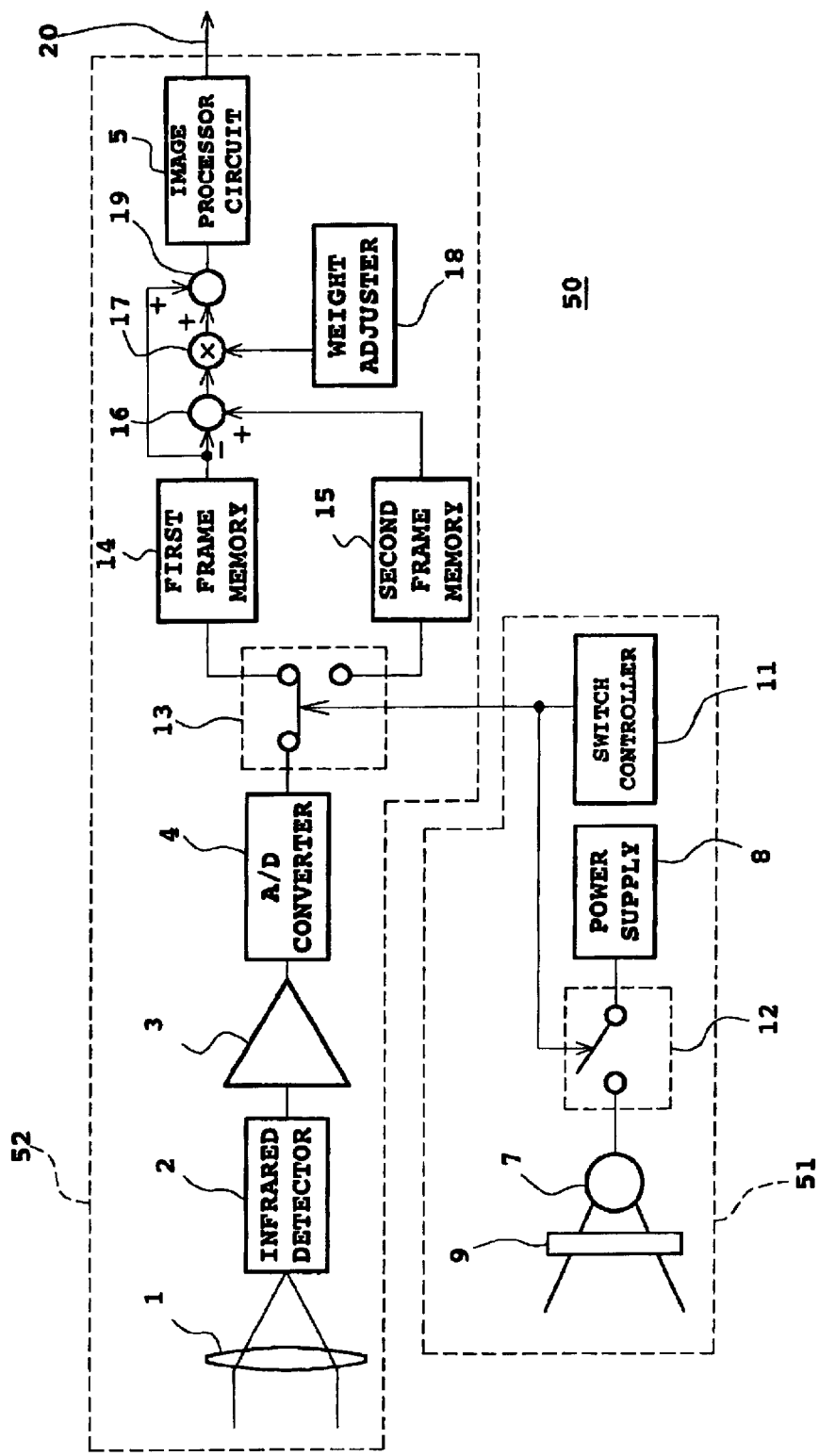
FIG. 3 is a diagram showing a structure of an infrared imaging apparatus according to a second embodiment of the present invention.

FIG. 3 shows a structure of an infrared imaging apparatus according to a second embodiment of the present invention. In FIG. 3, elements identical to or corresponding to the elements described earlier in the specification are assigned the same reference numerals.

In the first embodiment, an image signal in which the emitted light and reflected light from the target are superposed is output. However, with the infrared imaging apparatus of the first embodiment, in some cases, for example, when many targets are present or when the background is different while running in a city and running on a highway, the distance to the targets may not be clearly distinguishable based on the image signal in which the emitted light and the reflected light are simply superposed.

To this end, in the second embodiment, an infrared radiation in the absorption wavelength range is irradiated at a predetermined timing, and an emitted light signal which is based on the infrared radiation emitted from the target and a reflected light signal which is based on the infrared radiation reflected by the target are separately obtained. Then, a weight is assigned to the brightness of the reflected light signal. The weighted reflected light signal is then added to the emitted light signal to produce a superposed image signal. In this manner, by adding the weighted reflected light signal, it is possible to provide an image signal in which the distance to the target can more easily be recognized, depending on the situation.

As shown in FIG. 3, an infrared imaging apparatus 50 of the second embodiment has a structure similar to the infrared imaging apparatus 47 of the first embodiment. In addition, in order to achieve the object described above, an infrared irradiation unit 51 further comprises a switch controller 11 for outputting a switch signal for ON/OFF control of the power supply 8 and a switch 12 for switching the power supply 8 ON and OFF in response to the switch signal from the switch controller 11. An infrared imaging unit 52 further comprises a selector 13 for switching the output destination of the A/D converter 4 based on the switch signal from the switch controller 11, a first frame memory 14 for storing the digital signals from the A/D converter 4 when the switch signal is "OFF", and a second frame memory 15 for storing the digital signals from the A/D converter 4 when the switch signal is "ON". In addition, the infrared imaging unit 52 further comprises a subtractor 16 for subtracting the output of the first frame memory 14 from the output of the second frame memory 15, a multiplier 17 for assigning a predetermined weight to the output of the subtractor 16, a weight adjustor 18 for outputting a predetermined weight signal to the multiplier 17, and an adder 19 for adding the output of the multiplier 17 to the output of the first frame memory 14 to produce a synthesized signal. The output of the adder 19 is input to the image processor circuit 5 which converts the synthesized signal produced by the adder 19 to an image signal 20.

Each of the components will now be described.

The switch controller 11 outputs a switch signal of ON/OFF synchronized with the frame of the infrared imaging unit 52. The switch signal from the switch controller 11 is output to the switch 12 and to the selector 13. The switch 12 ON/OFF controls the power supply 8 at the timing of the switch signal so that the infrared irradiation unit 51 irradiates infrareds in the absorption wavelength range during when the switch signal is switched ON.

The selector 13 is connected to the first frame memory 14 during when the switch signal is "OFF" and to the second frame memory 15 during when the switch signal is "ON". The first frame memory 14 and the second frame memory 15 obtain digital signals from the A/D converter 4. Because of the switching of the selector 13, the first frame memory 14 stores the digital signal when the switch signal is "OFF", that is, the emitted light signal based on the infrared radiation emitted from the target and the second frame memory 15 stores the digital signal when the switch signals is "ON", that is, the digital signal including both the light emitted from the target and the light reflected by the target.

The subtractor 16 subtracts the output of the first frame memory 14 from the output of the second frame memory 15. In this manner, the reflected light signal based on the infrared radiation reflected by the target onto which the infrared radiation is irradiated from the infrared irradiation unit 51 can be obtained as the output of the substractor 16.

The multiplier 17 multiplies the brightness of the reflected light signal which is output from the substractor 16 by the weight signal supplied from the weight adjustor 18 so that the brightness of the reflected light signal which includes information on the distance to the target can be varied, and thus, an image signal in which the distance to the target can more easily be recognized can be output depending on the situation.

The weight adjustor 18 supplies the weight signal to the multiplier 17. For example, the weight signal can be adjusted into five levels by the weight adjustor 18. The weight signal from the weight adjustor 18 may be changed by the operator on the basis of the situation when the image is captured, or, alternatively, may be adjusted automatically, for example, according to the time of day, such as day and night settings.

The adder 19 adds the reflected light signal which is weighted by the multiplier 17 to the emitted light signal output from the first frame memory 14 to produce a synthesized signal. The synthesized signal from the adder 19 is converted into an image signal 20 by the image processor circuit 5 and then output.

As described, unlike in the first embodiment, the second embodiment is configured so that only the reflected light signal is obtained and the brightness of the reflected light signal is adjusted. Because of this, it is possible to output an image signal in which the distance to the target can more easily be recognized depending on the situation.

The operation of the infrared imaging apparatus of the second embodiment will now be described.

The switch controller 11 outputs a switch signal to the switch 12 and to the selector 13. The switch 12 controls ON/OFF of the power supply 8 based on the switch signal so that the infrared lamp 7 emits infrared radiation at the timing of the switch signal and the optical filter 9 passes only the infrared radiation in the absorption wavelength range.

Because the infrared lamp 7 is controlled to be switched ON and OFF, the infrared detector 2 of the infrared imaging unit 52 sequentially detects, through the lens 1, the emitted light from the target when the infrared irradiation unit 51 is not irradiating and the emitted light and reflected light from the target when the infrared irradiation unit 51 is irradiating. The infrared detector 2 converts the focused infrared radiation into an electrical signal. The electrical signal is amplified by the amplifier circuit 3 and converted into a digital signal by the A/D converter 4.

The selector 13 is also switched by the switch signal such that the digital signal is output to the first frame memory 14 when the switch signal is OFF and to the second frame memory 15 when the switch signal is ON. In other words, the first frame memory 14 stores emitted light signals based on the infrared radiation emitted from the target and the second frame memory 15 stores digital signals which include the emitted light from the target and the reflected light from the target.

The substractor 16 subtracts the output of the first frame memory 14 from the output of the second frame memory 15 to obtain a reflected light signal based on the infrared radiation reflected from the target which is irradiated with infrared radiation from the infrared irradiation unit 51. The reflected light signal output from the substractor 16 is then weighted by the multiplier 17. The adder 19 adds the weighted reflected light signal to the emitted light signal from the first frame memory 14 to produce a synthesized signal. The synthesized signal from the adder 19 is converted into an image signal by the image processor circuit 5 and the result is output.

As described, in the second embodiment, only the reflected light signal is obtained and the brightness of the reflected light signal is adjusted so that an image signal in which the distance to the target can more easily be recognized can be output under varied situations.

The reflected light signal can be obtained by any appropriate method other than the example method described in the second embodiment. For example, it is possible to obtain the reflected light signal by providing a filter which transmits only the infrared radiation in the wavelength range of the reflected light, and advancing and retracting the filter in front of the infrared detector 2 at a predetermined timing.

Moreover, although in the example of the second embodiment, the digital signal which is output from the A/D converter 4 is processed by a hardware circuit, the digital signal processing can also be performed through software processes by a computer.

Furthermore, in the second embodiment it is described that the emitted light signal and the weighted reflected light signal are synthesized, but it is also possible to synthesize the emitted light signal and the reflection light signal in a predetermined synthesizing ratio.

Third Embodiment

Figure 4:
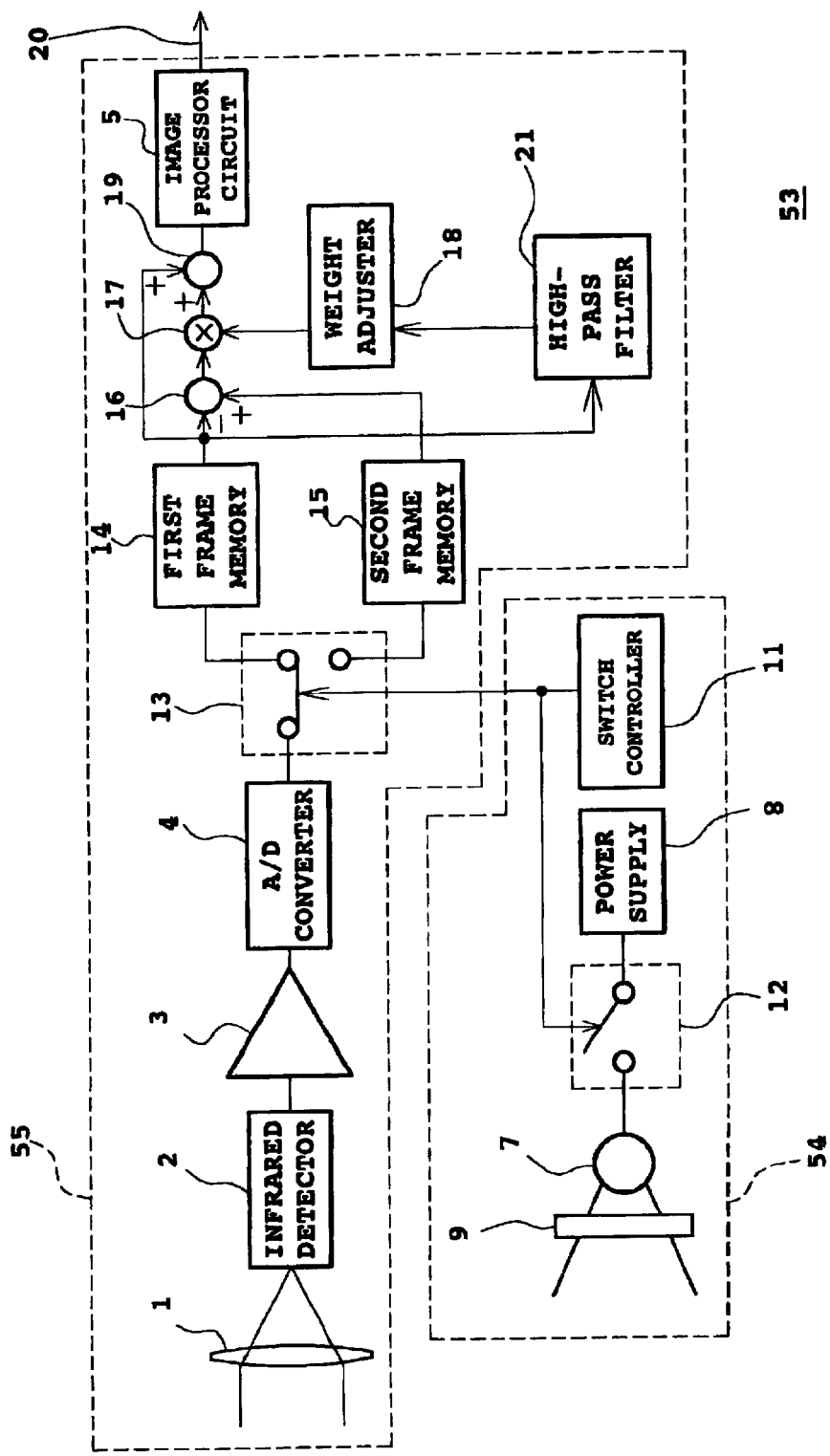
FIG. 4 is a diagram showing a structure of an infrared imaging apparatus according to a third embodiment of the present invention.

FIG. 4 shows a structure of an infrared imaging apparatus according to a third embodiment of the present invention. Elements identical to or corresponding to those described earlier are assigned the same reference numerals.

An infrared irradiation unit 54 and an infrared imaging unit 55 of an infrared imaging apparatus 53 of the third embodiment have structures similar to those of the second embodiment. A characteristic of the third embodiment is that the weight signal from the weight adjustor 18 described for the second embodiment is automatically adjusted according to the complexity of the captured image.

More specifically, a high-pass filter 21 which passes the high frequency component of the emitted light signal of the first frame memory 14 is provided in the infrared imaging unit 55. In general, the emitted light signal input to the high-pass filter 21 contains a larger high frequency component when the background is complex such as, for example, in a metropolitan area, than when the background is simple such as, for example, along a rural highway. By adjusting the weight signal, for example, so that the weight signal is large when a large amount of high frequency component is present and the weight signal is small when a small amount of high frequency component is present, an image signal in which the distance to the target can more easily be recognized can automatically be output.

Each component will now be described.

The high-pass filter 21 allows the high frequency component of the emitted light signal to pass. The detection value of the high frequency component at the high-pass filter is input to the weight adjustor 18. The weight adjustor 18 assigns a predetermined weight to the brightness of the reflected light signal based on the detection value of the high frequency component in the emitted light signal.

In this manner, in the third embodiment, the weight signal for the brightness of the reflected light signal is automatically adjusted based on the detection value at the high-pass filter. Because of this, an image signal in which the distance to the target can more easily be recognized can automatically be output.

Fourth Embodiment

Figure 5:
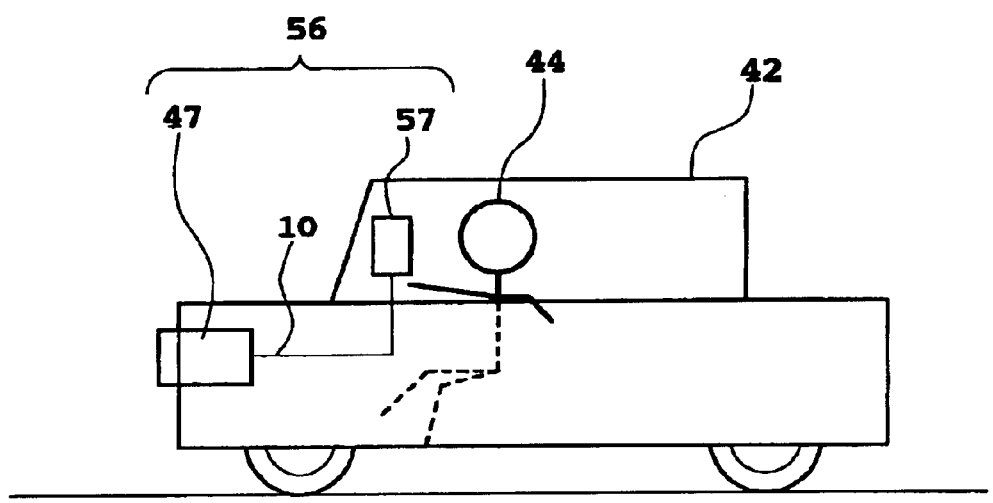
FIG. 5 is a diagram showing an overall structure of an infrared monitoring apparatus for a vehicle which employs an infrared imaging apparatus.
Figure 6:
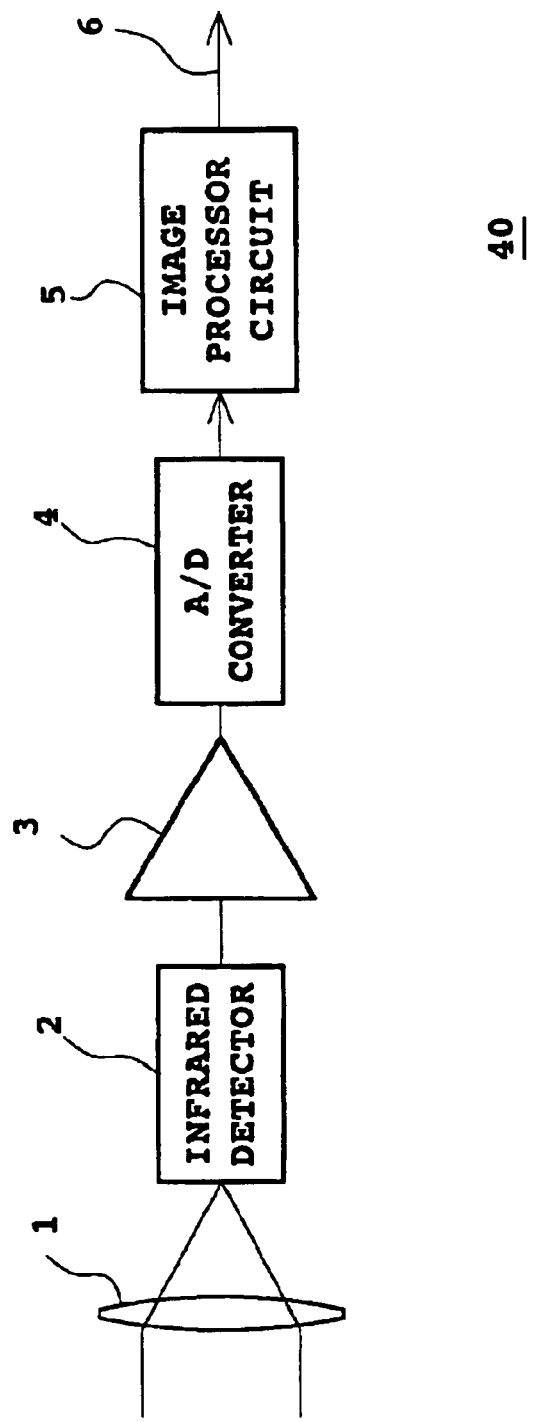
FIG. 6 is a block diagram showing a structure of a conventional infrared imaging apparatus.
Figure 7:
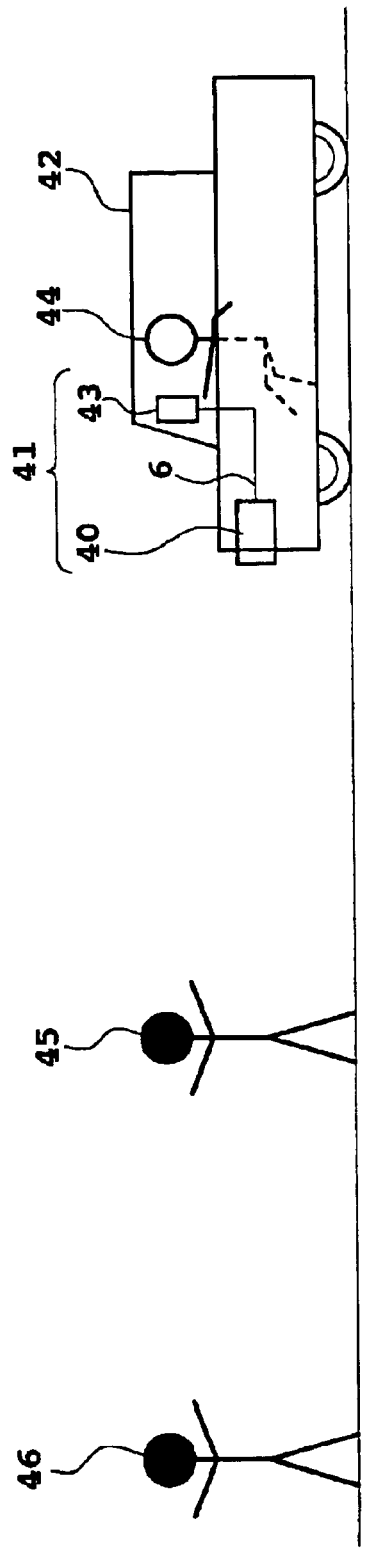
FIG. 7 is a diagram showing an overall structure of an infrared monitoring apparatus for a vehicle which employs a conventional infrared imaging apparatus.
Figure 8:
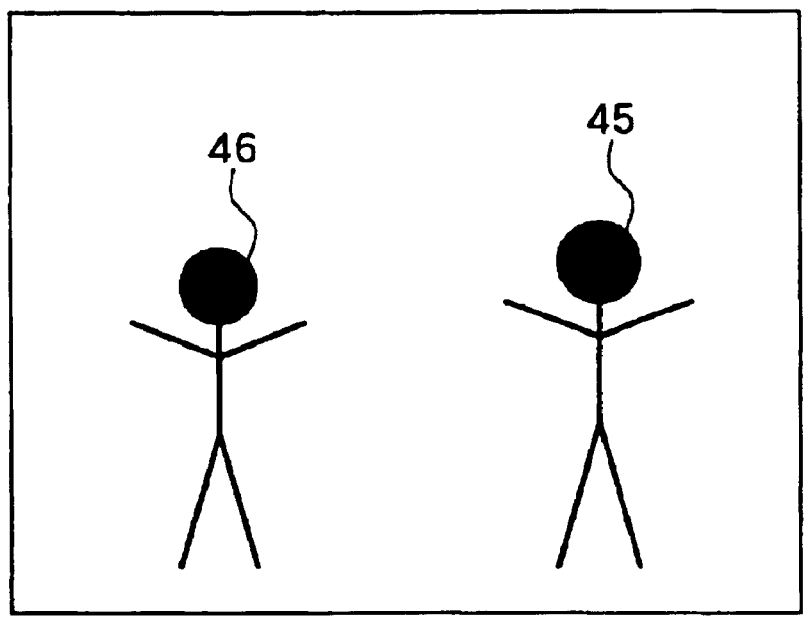
FIG. 8 is a diagram showing a display screen in a conventional infrared imaging apparatus.

FIG. 5 shows an overall structure of an infrared monitoring apparatus for a vehicle in which an infrared imaging apparatus is employed. FIG. 5 shows an example structure in which the infrared imaging apparatus 47 of the first embodiment is used, but it is also possible to use the infrared imaging apparatuses 50 and 53, respectively of the second and third embodiments.

As shown in FIG. 5, an infrared monitoring apparatus 56 for a vehicle comprises an infrared imaging apparatus 47 installed near the front of a vehicle 42 and a display device 57 for displaying an image based on an image signal 10 output from the infrared imaging apparatus 47. The display device 57 comprises, for example, a video monitor.

In the infrared monitoring device 56 for a vehicle having such structure, the image signal 10 output from the image processor circuit 5 of the infrared imaging apparatus 47 is input to the display device 57 and the display device 57 displays an image. The image can be displayed, for example, as a "distance image" in which the brightness is modulated depending on the distance to the target. Therefore, the driver 44 in the vehicle 42 can monitor the targets in front of the vehicle 42 by viewing the image on the display device 57. The infrared monitoring apparatus 56 for a vehicle is useful for, for example, recognizing obstructions at night when the driver's view is limited. Also, because the infrared monitoring apparatus 56 for a vehicle according to the fourth embodiment allows recognition of the distance to the target, the driver can more accurately decide when actions should be taken to avoid a target.

As described, according to the present invention, an infrared irradiation unit for irradiating infrared radiation in an attenuation wavelength range in which the infrared radiation is attenuated according to the transmitted distance is provided, the infrared radiation emitted from the target and the reflected light from the target are detected together, and the image signal is output. Because of this, an image signal from which the distance to the target can be recognized can be output.

Also, according to the present invention, a light signal reflected from a target onto which infrared radiation is irradiated from an infrared irradiation unit is obtained and the brightness of the reflected light signal is adjusted. Because of this, it is possible to output an image signal from which the distance to the target can more easily be recognized.

Furthermore, according to the present invention, the weighting of the brightness of the reflected light signal can be automatically adjusted based on the detection value at the high-pass filter. In this way, it is possible to automatically obtain and output an image signal from which the distance to the target can more easily be recognized.

While this invention has been described in conjunction with the exemplary embodiments outlined above, it is evident that many alternatives, modifications, and variations will be apparent to those skilled in the art. Accordingly, the exemplary embodiments of the invention may be reconfigured without departing from the spirit and scope of the invention.

What is claimed is:

1. An infrared imaging apparatus comprising:
    an infrared irradiation unit for irradiating infrared radiation in an attenuation wavelength range in which the infrared radiation is attenuated depending on the transmitted distance; and
    an infrared imaging unit for detecting infrared radiation emitted from a target and infrared radiation reflected by the target, and outputting an image signal,
    wherein said infrared imaging unit comprises:
        an infrared detector for detecting infrared radiation emitted from a target and infrared radiation reflected by the target, and converting the detected infrared radiation into an electrical signal;
        a circuit for obtaining, from said electrical signal, an emitted light signal which is based on the infrared radiation emitted from the target;
        a circuit for obtaining, from said electrical signal, a reflected light signal which is based on the infrared radiation reflected by the target onto which infrared radiation from the infrared irradiation unit is irradiated;
        a weight adjustor for assigning a predetermined weight to the brightness of said reflected light signal; and
        a signal synthesizer for adding said emitted light signal and the weighted reflected light signal to produce a synthesized signal.

2. An infrared imaging apparatus according to claim 1, wherein
    said infrared imaging unit further comprises a high-pass filter for passing the high frequency component of said emitted light signal; and said weight adjuster assigns the predetermined weight to the brightness of the reflected light signal based on the detection value of the high frequency component of the emitted light signal at the high-pass filter.

3. An infrared imaging apparatus according to claim 1, wherein said infrared imaging unit is an uncooled IR camera.

4. An infrared imaging apparatus according to claim 1, wherein said infrared radiation in the attenuation wavelength range radiated by said infrared irradiation unit is in a wavelength range of 5 micrometers to 8 micrometers.

5. An infrared monitoring apparatus for a vehicle, comprising:

an infrared imaging apparatus for detecting infrared radiation emitted from a target and outputting an image signal, said infrared imaging apparatus comprising an infrared irradiation unit for radiating infrared radiation in an attenuation wavelength range in which the infrared radiation is attenuated depending on the transmitted distance, an infrared imaging unit for detecting infrared radiation emitted from the target and infrared radiation reflected by the target and outputting an image signal; and a display device for displaying an image based on the image signal output from said infrared imaging apparatus, wherein said infrared imaging unit comprises:

an infrared detector for detecting infrared radiation emitted from a target and infrared radiation reflected by the target, and converting the detected infrared radiation into an electrical signal;

a circuit for obtaining, from said electrical signal, an emitted light signal which is based on the infrared radiation emitted from the target;

a circuit for obtaining, from said electrical signal, a reflected light signal which is based on the infrared radiation reflected by the target onto which infrared radiation from the infrared irradiation unit is irradiated;

a weight adjustor for assigning a predetermined weight to the brightness of said reflected light signal; and a signal synthesizer for adding said emitted tight signal and the weighted reflected light signal to produce a synthesized signal.

* * * * *